(12) United States Patent
Jensen et al.

(10) Patent No.: US 8,125,406 B1
(45) Date of Patent: Feb. 28, 2012

(54) CUSTOM, EFFICIENT OPTICAL DISTORTION REDUCTION SYSTEM AND METHOD

(75) Inventors: David W. Jensen, Cedar Rapids, IA (US); Richard D. Tompkins, Hollister, CA (US); Susan Robbins, San Jose, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 347 days.

(21) Appl. No.: 12/572,669

(22) Filed: Oct. 2, 2009

(51) Int. Cl.
*G09G 5/00* (2006.01)
(52) U.S. Cl. ................................. 345/9; 345/7
(58) Field of Classification Search .................. 345/7–9; 359/630
See application file for complete search history.

(56) References Cited

U.S. PATENT DOCUMENTS

| | | | |
|---|---|---|---|
| 2005/0122477 A1* | 6/2005 | Alster et al. | 351/237 |
| 2007/0200927 A1* | 8/2007 | Krenik | 348/47 |
| 2008/0024594 A1* | 1/2008 | Ritchey | 348/36 |
| 2011/0227487 A1* | 9/2011 | Nichol et al. | 315/158 |
| 2011/0255303 A1* | 10/2011 | Nichol et al. | 362/606 |

* cited by examiner

*Primary Examiner* — Ricardo L Osorio
(74) *Attorney, Agent, or Firm* — Donna P. Suchy; Daniel M. Barbieri

(57) ABSTRACT

Systems and methods for custom efficient optical distortion reduction where an image is pre-distorted based on the characterization of an optical system, so that when projected onto a curved optical surface the viewer sees a non distorted image. The approach involves characterizing an optical system with an optical distortion polynomial and then segmenting the field of view into smaller segments. Each segment is characterized with a lower order polynomial. The image is segmented and a computer processor applies distortion correction to each image segment based on the polynomial determined for the associated smaller segment. Alternately, two or more of the image segments may be processed simultaneously using a plurality of microprocessors. The data associated with each image segment is then stitched together to recreate a pre-distorted version of the original image.

18 Claims, 2 Drawing Sheets

PRIOR ART

CUSTOM, EFFICIENT OPTICAL DISTORTION REDUCTION SYSTEM AND METHOD

CROSS REFERENCE TO RELATED APPLICATIONS

This application relates to the following applications filed on even date herewith and each incorporated herein by these references in their entirety:

Multiprocessor Discrete Wavelet Transform by John K. Gee, Jennifer A. Davis, David W. Jensen and James Potts, Ser. No. 12/572,600; Optical Helmet Tracking System by Jaclyn A. Hoke and David W. Jensen, Ser. No. 12/572,542; and Multiple Aperture Video Image Enhancement System by David W. Jensen and Steven E. Koenck, Ser. No. 12/572,492.

FIELD OF THE INVENTION

The present invention relates to optical distortion reduction and more specifically to custom systems and methods for reduction of optical distortion in individual helmet-mounted displays in an efficient manner.

BACKGROUND OF THE INVENTION

When an image is projected onto a curved optical surface, such as a windshield or a helmet visor or is captured through a curved optical surface, such as a camera lens, it is common for the image to become optically distorted. In the past, mathematical algorithms containing sets of polynomials have been used to pre-correct an image before it is projected onto a curved surface and/or through the optical system of a helmet-mounted display (HMD) with predetermined optical distortion producing characteristics. This is done to reduce the observable distortion in the finally viewed image. Traditionally, the HMD optics and the inside surface of a helmet visor, which is used to project images to a pilot, are characterized with a sophisticated test rig, and high-order polynomials (e.g. $10^{th}$ order) have been used to characterize the shape and, therefore, the correction needed to achieve the desired image. However, these high-order polynomial algorithms are computationally intensive and are difficult to implement in a real time system.

The problems associated with high-order polynomials are indeed not new. Before the advent of computer aided design (CAD) systems, draftsmen were known to attempt to plot polynomials by breaking them up into numerous segments, each segment being approximated by simpler polynomials, and a set of French curves was an essential tool in this endeavor.

But with the advent of modern computing, higher order polynomials could be handled, but they often were too slow and required too much computing resources to be used with military video applications.

Today various tricks are known in the art as ways to overcome the problems associated with dealing with such high-order polynomials. One approach is to precompute the pixel distortion and store the amount in a large table. Memory access speeds and memory cost make this approach prohibitive for some applications.

Also, it has been known that other optical systems, such as camera lenses, can have their images improved by digitally correcting problems, such as a drop in brightness as one moves further from the center of a lens.

The present invention overcomes long-standing problems associated with distortion of optical images, especially when images are being processed at video rates.

SUMMARY OF THE INVENTION

Computer images are mathematically distorted before being projected onto the visor and/or through the HMD optics. The distorted image appears rectangular to the person viewing the display. To accurately distort the image, the computer algorithm uses a high-order (e.g., 10th order) set of polynomials. These polynomials are computationally intensive and difficult to implement in a real time system. This invention provides an efficient alternative implementation to those high-order polynomials.

Accordingly, the present invention can be summarized as follows: a custom system for efficiently reducing optical distortion in a particular helmet-mounted display comprising:

an optical element comprising a first curved optical surface, which surface is associated with optical element distortion;

said first curved optical surface being logically subdivided into a plurality of smaller curved optical surface segments, each segment associated with a segment distortion;

wherein said optical element distortion can be characterized across the optical element with an optical element polynomial;

wherein at least one of said segment distortions of said plurality of smaller curved optical surface segments, can be characterized with a segment polynomial which is a lower order polynomial than said optical element polynomial;

a computer processor configured to apply distortion correction to each of said smaller curved optical segments based upon the segment polynomial associated with said smaller curved optical segments;

said computer processor further configured to combine data associated with each smaller curved optical segments to collectively improve image quality of images associated with said first curved optical surface.

DETAILED DESCRIPTION

Figure 1:
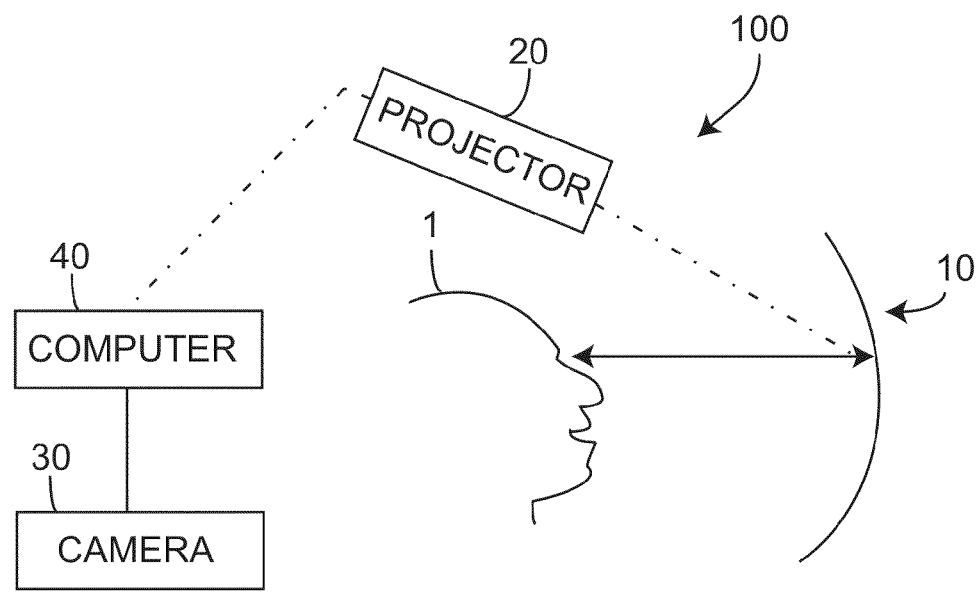
FIG. 1 shows a system of the prior art used to implement a pre-distortion error correcting image projected onto a curved optical surface with a predetermined distortion causing characteristic, where the dotted lines show a distorted image or distorted image data.

Now referring to the drawings, wherein like numerals refer to like matter throughout and more particularly referring to FIG. 1, there is shown a Helmet-Mounted Display (HMD) system of the prior art, generally designated 100, including a human viewer 1 which may be a helicopter pilot or any person looking through an optical element or a more complex optical system of elements 10 which may include a curved surface of a shield or visor mounted on a helmet. A projector 20 is shown projecting a pre-distorted image toward the optical element or system 10 where it is reflected back to the viewer 1, in the predetermined way which will cancel out the intentionally pre-distorted image output by the projector 20, so that the viewer sees a non-distorted image. The projector 20 receives its signals from an image source 30, which could be a camera or other sensor, but the projector does not project the camera output directly; instead, the processors 40, which could be a single processor or multiple processors pre-distort or apply a forward error correcting distortion to the signal before it is sent to the projector 20.

This problem of the prior art is exacerbated by the fact that the image seen of the outside scene by viewer 1 looking through the optical element is also distorted. The forward error correcting pre-distortion of the signal to the projector must also attempt to align the image up with the distorted image that the viewer 1 is receiving through the optical element 10. The prior art system of FIG. 1 shows nothing disposed between the projector and the optical element 10. It should be understood by those skilled in the art that relay optics often are used there, and these relay optics can pre-distort the projected image in a known manner.

Figure 2:
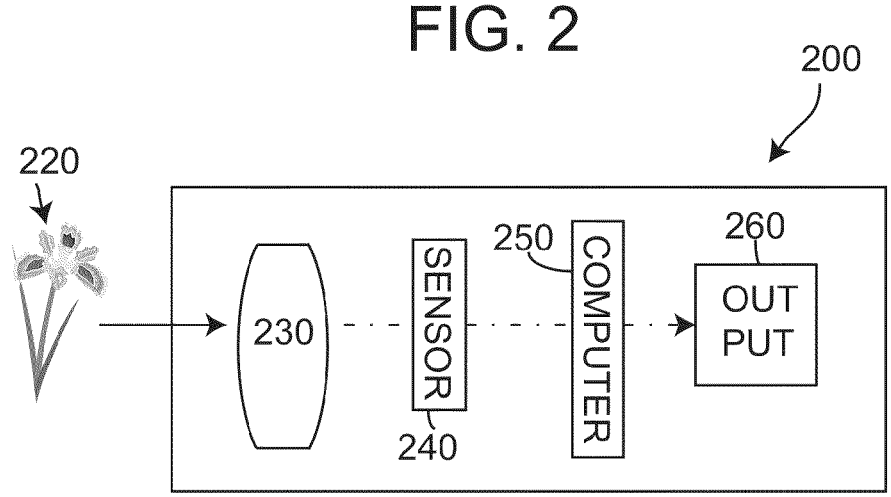
FIG. 2 shows a system of the prior art where a camera has post-processing of an image which has been optically altered by passing through a lens, where the dotted lines refer to altered images or altered image data.

Now referring to FIG. 2, there is shown a digital camera system of the prior art, generally designated 200, including a camera lens 230 receiving light from a real world scene 220. The light is affected by the camera lens and strikes a sensor 240 where electronic data is generated of the optically altered image; a computing system 250 corrects the altered image data to achieve an improved image at output 260. It has been known to correct for the decrease in amplitude in the light as a function of distance from the center of the lens.

Figure 3:
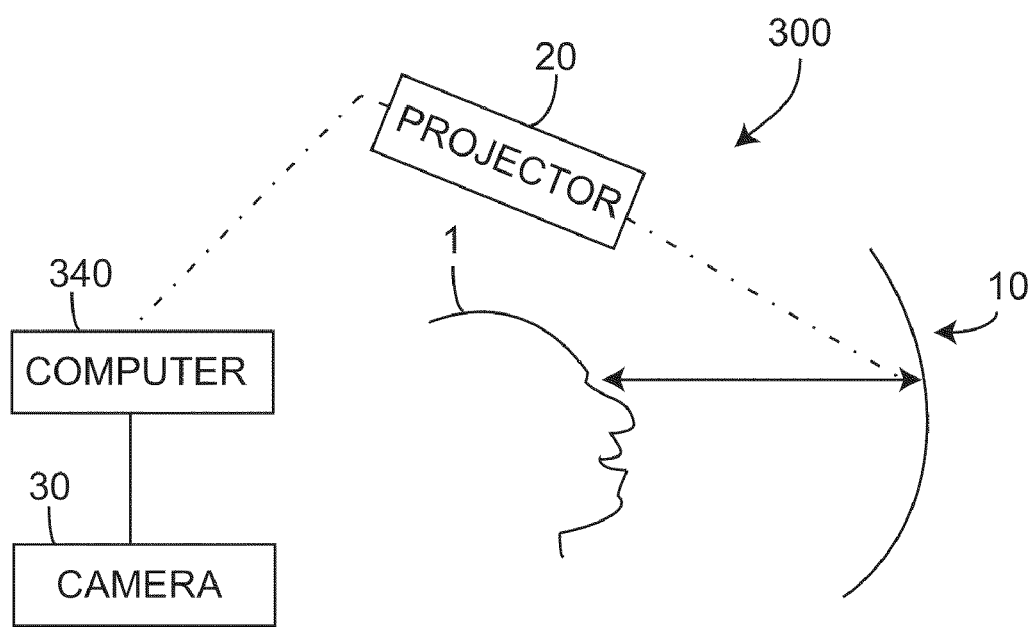
FIG. 3 shows a system of the present invention where the dotted lines show a distorted image or distorted image data.

Now referring to FIG. 3, the present invention is shown to include a system quite similar to the prior art FIG. 1 except for the differences noted below. The optical system 10, the projector 20 and the camera 30 all may be the same as those well known in the prior art. The computer processor 340 may be quite different, depending upon system requirements and design limitations.

The preferred embodiment relates to the correction or reduction of optical distortion that occurs when an image is projected onto a curved optical surface or through an HMD optical system.

A curved optical surface is part of the optical system and refers to any non-planar surface. The curved optical surface may cause significant optical element distortion.

Optical distortion refers to the distortion of an image when projected onto or captured through a curved optical surface or an HMD optical system. There are various kinds of optical element distortion which can be addressed by the present invention.

Each curved optical element 10 can be logically viewed as a surface which includes a plurality of smaller surface segments. Each smaller surface segment is then analyzed and associated with a segment distortion that is further related to a specific region of an image. Distortion data for each of the smaller segments is determined by the test rig developed data associated with that portion of the display field of view.

The optical distortion of the HMD can be represented with an optical element polynomial or also referred to as an optical distortion polynomial. An optical distortion polynomial consists of coefficients and variables representing the angles viewed at the pilot's eye. The more complex the distortion, the higher the order of polynomial that is necessary to characterize it. For example, an optical element that is a portion of a perfect sphere would be much easier to compensate for than an optical element that has a much more complex radius of curvature changing shape which would require more than a $3^{rd}$ order polynomial. When there are even very small manufacturing tolerances or anomalies in the optical elements 10, the necessary order of the polynomial can be much higher.

However, segment distortion can be characterized by a segment polynomial. A segment polynomial is a polynomial associated with a smaller segment and is often a lower order than the order of the entire optical distortion polynomial. For example, if the distortion polynomial associated with a curved optical system is of $10^{th}$ order, a $4^{th}$ order polynomial associated with a specific smaller segment is a segment polynomial. The lower the order of the polynomial, the easier the computation.

In order to meet HMD accuracy requirements, $10^{th}$ order polynomials might be used to represent the HMD optical distortion.

In one exemplary embodiment of the present invention, four sets of $10^{th}$ order polynomial are stored on the HMD EEPROM—two for the left eye and two for the right eye. Each pair of polynomials represents the following transfer functions:

$Az_{out} = f(H,V)$ Azimuth angle ($Az_{out}$) as a function of LCD horizontal and vertical pixel position ($H,V$)

$El_{out} = f(H,V)$ Elevation angle ($El_{out}$) as a function of LCD horizontal and vertical pixel position ($H,V$).

The two polynomials for each eye are used to accurately predict the outside world angles ($Az_{out}$, $El_{out}$) for any LCD pixel position that falls within the monocular field of view. The polynomial is optimized over an area that extends to half a degree beyond the edges of the 40° by 30° monocular field of view of each display. Typically, the performance of the polynomial is not controlled outside of the defined field of view, and it is likely that the behavior outside of his region will be erratic, as is typical of high-order polynomials.

Because high-order polynomial algorithms are mathematically intense, they can take considerable time and power to perform. This makes it difficult to implement optical distortion reduction in a real time military video system. The following equations illustrate the complexity of the $10^{th}$ order polynomials.

$$Az_{out}' = C_1 C_2 V + C_3 V^2 + C_4 V^3 + C_5 V^4 + C_6 V^5 + C_7 V^6 + C_8 V^7 + C_9 V^8 + C_{10} V^9 + C_{11} V^{10} + C_{12} H + C_{13} H V + C_{14} H V^2 + C_{15} H V^3 + C_{16} H V^4 + C_{17} H V^5 + C_{18} H V^6 + C_{19} H V^7 + C_{20} H V^8 + C_{21} H V^9 + C_{22} H^2 + C_{23} H^2 V + C_{24} H^2 V^2 + C_{25} H^2 V^3 + C_{26} H^2 V^4 + C_{27} H^2 V^5 + C_{28} H^2 V^6 + C_{29} H^2 V^7 + C_{30} H^2 V^8 + C_{31} H^3 + C_{32} H^3 V + C_{33} H^3 V^2 + C_{34} H^3 V^3 + C_{35} H^3 V^4 + C_{36} H^3 V^5 + C_{37} H^3 V^6 + C_{38} H^3 V^7 + C_{39} H^4 + C_{40} H^4 V + C_{41} H^4 V^2 + C_{42} H^4 V^3 + C_{43} H^4 V^4 + C_{44} H^4 V^5 + C_{45} H^4 V^6 + C_{46} H^5 + C_{47} H^5 V + C_{48} H^5 V^2 + C_{49} H^5 V^3 + C_{50} H^5 V^4 + C_{51} H^5 V^5 + C_{52} H^6 + C_{53} H^6 V + C_{54} H^6 V^2 + C_{55} H^6 V^3 + C_{56} H^6 V^4 + C_{57} H^7 + C_{58} H^7 V + C_{59} H^7 V^2 + C_{60} H^7 V^3 + C_{61} H^8 + C_{62} H^8 V + C_{63} H^8 V^2 + C_{64} H^9 + C_{65} H^9 V + C_{66} H^{10}$$

$$El_{out}' = C_{67} + C_{68} V + C_{69} V^2 + C_{70} V^3 + V^3 + C_{71} V^4 + C_{72} V^5 + C_{73} V^6 + C_{74} V^7 + C_{75} V^8 + C_{76} V^9 + C_{77} V^{10} C_{78} H + C_{79} H V + C_{80} H V^2 + C_{81} H V^3 + C_{82} H V^4 + C_{83} H V^5 + C_{84} H V^6 + C_{85} H V^7 + C_{86} H V^8 + C_{87} H V^9 + C_{88} H^2 + C_{89} H^2 V + C_{90} H^2 V^2 + C_{91} H^2 V^3 + C_{92} H^2 V^4 + C_{93} H^2 V^5 + C_{94} H^2 V^6 + C_{95} H^2 V^7 + C_{96} H^2 V^8 + C_{97} H^3 + C_{98} H^3 V + C_{99} H^3 V^2 + C_{100} H^3 V^3 + C_{101} H^3 V^4 + C_{102} H^3 V^5 + C_{103} H^3 V^6 + C_{104} H^3 V^7 + C_{105} H^4 + C_{106} H^4 V + C_{107} H^4 V^2 + C_{108} H^4 V^3 + C_{109} H^4 V^4 + C_{110} H^4 V^5 + C_{111} H^4 V^6 + C_{112} H^5 + C_{113} H^5 V + C_{114} H^5 V^2 + C_{115} H^5 V^3 + C_{116} H^5 V^4 + C_{117} H^5 V^5 + C_{118} H^6 + C_{119} H^6 V + C_{120} H^6 V^2 + C_{122} H^6 V^3 + C_{122} H^6 V^4 + C_{123} H^7 + C_{124} H^7 V + C_{125} H^7 V^2 + C_{126} H^7 V^3 + C_{127} H^8 + C_{128} H^8 V + C_{129} H^8 V^2 + C_{130} H^9 + C_{131} H^9 V + C_{132} H^{10}$$

Each 10th order polynomial contains 66 coefficients where Azout and Elout are the outside world angles, H and V are the horizontal and vertical LCD pixel positions, and Cn represents the coefficient number. In comparison, a $5^{th}$ order polynomial only has 21 coefficients, a $4^{th}$ order polynomial only has 15 coefficients, and a $2^{nd}$ order polynomial only has 6 coefficients. The number of mathematical operations is proportional to the number of coefficients. A $2^{nd}$ order polynomial requires 1/10 the number of mathematical operations compared to a $10^{th}$ order polynomial.

Efficient optical distortion reduction solves this computation problem by splitting the image into multiple smaller regions and using separate and different lower-order (e.g. $3^{rd}$ order) polynomials for each region or segment. The test rig is used to determine the $10^{th}$ order polynomials to represent the optical distortion for the helmet. Lower-order polynomials can be used to correct distortion in each smaller segment and its associated image region. The coefficients for the lower-order polynomial equations are computed with linear algebra to solve simultaneous equations. The solution to those equations provides the best coefficients to closely match the higher polynomial for each of the segment regions. Coefficients for multiple lower-order equations ($2^{nd}$, $3^{rd}$, $4^{th}$, etc.) can be produced. A comparison is made between each of the lower-order polynomials and the original optical element polynomial using a root mean square (RMS) error. The lowest-order segment polynomial providing an acceptable RMS error compared with the higher-order polynomial is the best order for that region. Normally, the RMS error is less with higher-order polynomials; however, subdividing the data over even more partitions allows for a reduced order polynomial to be used while maintaining an equivalent or reduced RMS error. In other words, the more and the smaller the image regions or segments, the lower the polynomial order required to achieve the desired distortion correction. Design trade-offs will need to be made in each application. It may be that the distortion polynomial has an order of 10 and the segment polynomial has an order of 4 or 3. In such cases, the decrease in complexity in computing resources needed for each segment can be substantial. As noted above, a $2^{nd}$ order polynomial requires 1/10 the number of mathematical operations compared to a $10^{th}$ order polynomial.

Once the best order polynomial is determined for each image region, a computer processor is used to apply the lower order segment polynomials to the associated image region. Because these are simpler operations involved with the segment polynomials, the computer processor is able to run the algorithms more rapidly. The processing of these algorithms on independent image regions also executes well in distributed or parallel processing and in a multicore environment. Using multiple processors reduces the amount of computing that each processor has to perform; for example, with sixteen processors each rendering its own polynomial function. Each processor is responsible for computing a subset of the entire data. Even if there were no reduction in the order of the polynomials needed to characterize a segment, with sixteen processors, each processor would be responsible for one sixteenth of the computing. Each would process one-fourth of the region in the x direction and one-fourth in the y direction. This would equal 6.25% of the total computing per processor, which implies a speed-up factor of 16. Combined with the reduction in operations with the lower order segment polynomials, the speed factor can be 100 to 200. This approach enables real time processing of the distortion algorithm on lower power, lower performance, and lower cost processors. It also makes it possible to implement optical distortion reduction in a real time system. The system latency is greatly reduced when the benefits of lower order polynomials are simultaneously achieved. The flow of this process is described below.

Finally, after each segment polynomial is applied to its respective image region, the computer processor combines the image regions to recreate a corrected version of the original image by stitching the image regions together. The removal of distortion is in itself helpful in the stitching together process.

Figure 4:
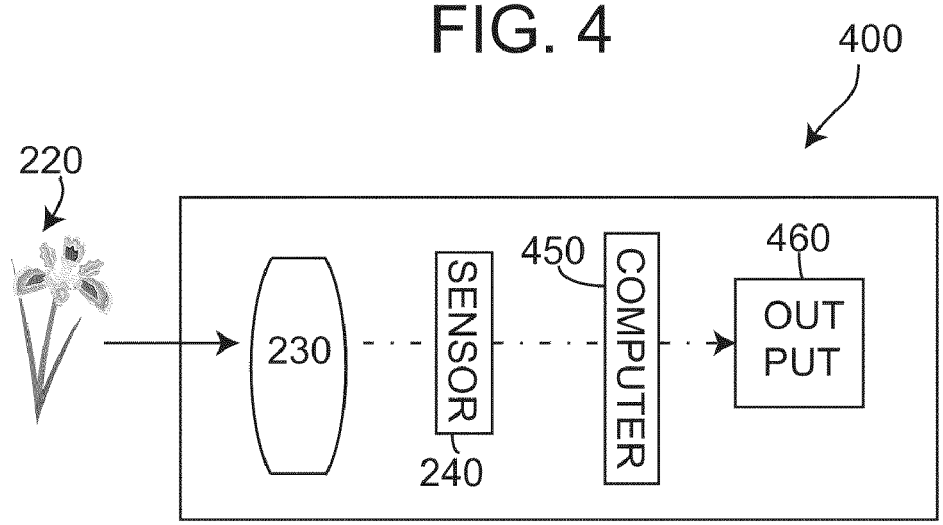
FIG. 4 is a system of the present invention where the dotted lines refer to altered images or altered image data.

The present invention is described for use with a helmet-mounted display, but it can be used with any optical system that induces distortion. Now referring to FIG. 4, there is shown a simple example of the present invention used in a camera 400 to process the image detected by a digital sensor 240 after the image has experienced some distortion by the camera lens 230. The same process that was described above to pre-distort the image before it interacts with the optical element 10 (FIGS. 1 and 3) can be used to remove distortion after it is caused by an optical element and prepare a distortion corrected output 460. Of course, a simple single lens 230 is shown for simplicity, but it should be understood that the term "optical element" is intended herein to be any lens, mirror, reflecting surface, combination of the same or any structure which is capable of imparting upon light incident thereon with a known and predictable alteration or distortion.

Throughout this discussion, it has been assumed that the curved optical surface would be logically subdivided, a preferred embodiment might be addressed similarly but slightly differently, For example, in one embodiment, it could be the displayed (pre-distorted) image that is broken into rectilinear segments at the image source (AMLCD), which means that each of these segments is an irregular shape by the time it hits the visor. I.e. it may actually be the source image that has to be broken into segments. The basic concept of the present invention remains, that the higher order polynomials can be avoided by segmenting the source image and characterizing those segments with lower order polynomials and then parallel processing the segments. It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such a feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A custom system for efficiently reducing optical distortion in a particular helmet-mounted display comprising:
   an optical element comprising a first curved optical surface, which surface is associated with optical element distortion;
   said first curved optical surface being logically subdivided into a plurality of smaller curved optical surface segments, each segment associated with a segment distortion;
   wherein said optical element distortion can be characterized across the optical element with an optical element polynomial;
   wherein at least one of said segment distortions of said plurality of smaller curved optical surface segments, can be characterized with a segment polynomial which is a lower order polynomial than said optical element polynomial;
   a computer processor configured to apply distortion correction to each of said smaller curved optical segments based upon the segment polynomial associated with said smaller curved optical segments; and
   said computer processor further configured to combine data associated with each smaller curved optical segment to collectively improve image quality of images associated with said first curved optical surface.

2. The system of claim 1 further comprising a projector which receives projector data which has been intentionally pre-distorted before it is being projected onto the optical element.

3. The system of claim 2 wherein the computer processor is a single processor.

4. The system of claim 1 wherein the computer processor comprises a plurality of microprocessors arranged logically in a parallel configuration.

5. The system of claim 4 wherein the plurality of microprocessors are all part of a single multi-core processor.

6. The system of claim 1 wherein the optical element polynomial has an order of n and the segment polynomial has an order which is smaller than n/2.

7. The system of claim 6 where the optical element is a curved transparent visor in a helmet which exhibits distortion of images seen therethrough, and said projector data is altered in response to a prior determination of distortion of images seen through the curved transparent visor.

8. The system of claim 7 wherein the optical element polynomial has an order of n and the segment polynomial has an order which is smaller than n/3.

9. A method of compensating for optical distortions in an optical element in real time comprising the steps of:
   providing an optical element comprising a first curved optical surface, which surface is associated with an optical element distortion;
   logically dividing said first curved optical surface into a plurality of smaller curved optical surface segments;
   associating with each smaller optical surface segment a segment distortion;
   characterizing said optical element distortion across the optical element with an optical element polynomial;
   characterizing at least one of said segment distortions of said smaller curved optical surface segments, with a segment polynomial which is a lower order polynomial than said optical element polynomial;
   implementing a distortion correction for each of said smaller curved optical segments using the segment polynomial associated with said smaller curved optical segments; and
   combining data associated with each smaller curved optical segments to improve image quality of images associated with said first curved optical surface.

10. A method of correcting optical distortion in a curved transparent head-worn visor comprising the steps of:
    characterizing with an optical element polynomial, an optical distortion characteristic of an optical element which is curved and transparent;
    determining optical element root mean square error data for the optical element polynomial;
    segmenting the optical element into a plurality of smaller curved optical surface segments;
    characterizing, with a segment polynomial, the plurality of smaller curved optical surface segments to determine a maximum polynomial order using the optical element root mean square error data;
    save in memory, the segment polynomial for each of the plurality of smaller curved optical surface segments;
    apply, using a computer processor, the segment polynomial to an individual image sub-region which is associated with one of the plurality of smaller curved optical surface segments and the segment polynomial; and
    stitch together individual image segments or sub-regions to recreate a corrected image.

11. The method of claim 10 wherein:
    the step of characterizing with an optical element polynomial comprises analyzing, with a test rig, the surface shape of the optical element so as to generate a polynomial which describes such shape within a predetermined error tolerance.

12. The method of claim 11 wherein the step of:
    characterizing, with a segment polynomial, the plurality of smaller curved optical surface segments, is performed by simultaneously solving sets of linear equations using the optical element polynomial values or test rig values to minimize the RMS error.

13. The method of claim 12 wherein the step of:
    applying, using a computer processor, is performed with a plurality of computer processors organized to perform parallel processing.

14. The method of claim 13 wherein the plurality of computer processor comprises a multi-core processor.

15. A method of pre-distorting an image to be projected onto a curved reflective surface, so that a reflection of the pre-distorted images is made to mimic an original desired image, the method comprising the steps of:
    providing a system for projecting a pre-distorted image onto a curved optical surface, where distortion errors caused by reflecting off the curved optical surface can be substantially overcome by applying a polynomial function of an Nth order polynomial, where N is at least 8, to original data to be presented to a viewer;
    segmenting the curved optical surface into a plurality of smaller more curved optical surface segments each of which can be characterized by having segment distortion errors caused by reflecting off the curved optical surface segment, so that such segment distortion errors can be substantially overcome by applying a segment polynomial function of at most an X order polynomial, where X is 3N/4 which shall be rounded down to a next lowest integer;

generating a corresponding segment polynomial function for each of said plurality of smaller curved optical surface segments; and pre-distorting only a portion of the original data, with a corresponding segment polynomial function.

16. The method of claim 15 wherein X is N/2.
17. The method of claim 15 wherein X is N/3.
18. The method of claim 15 wherein X is N/4.

\* \* \* \* \*